July 19, 1949.    M. E. McCLELLAN    2,476,751
PLATFORM ADJUSTING MEANS
Filed May 1, 1942
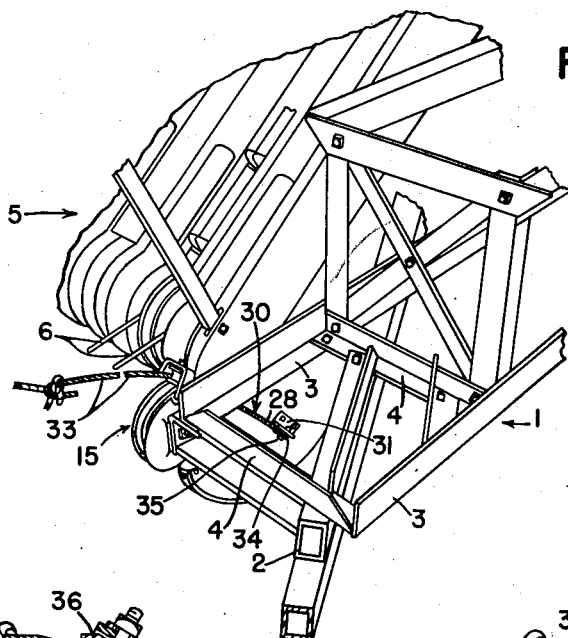
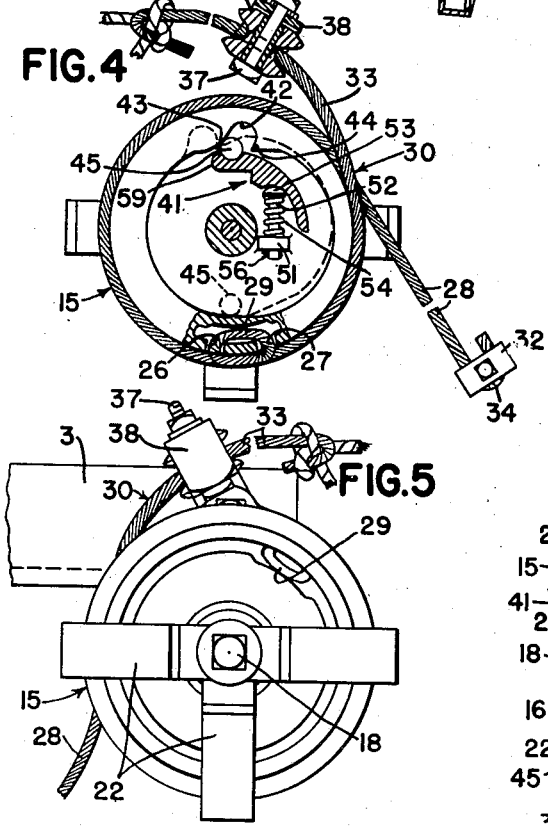
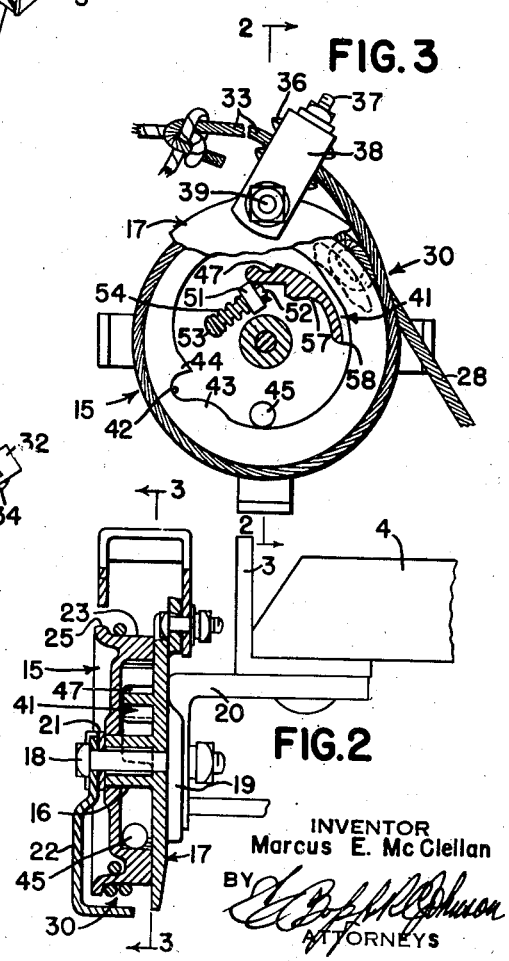
INVENTOR
Marcus E. McClellan
BY
ATTORNEYS Patented July 19, 1949

2,476,751

UNITED STATES PATENT OFFICE 2,476,751

PLATFORM ADJUSTING MEANS

Marcus E. McClellan, Ottumwa, Iowa, assignor, by mesne assignments, to Deere Manufacturing Co., a corporation of Iowa Application May 1, 1942, Serial No. 441,401

6 Claims. (Cl. 56—208)

The present invention relates generally to agricultural implements and more particularly to means for controlling the pick-up unit of a windrow pick-up press or other similar agricultural machine.

The object and general nature of the present invention is the provision of new and improved means for carrying the front end of the pick-up unit of a windrow pick-up press. It is usually common to support the front end of the pick-up unit either on gauge wheels, which may be adjustable, or by spring counterbalancing means or the equivalent, whereby the pick-up unit is floatingly connected with the main frame of the machine, the front end of the pick-up unit in both cases being supported for movement closely adjacent the ground surface when in operating position. A machine of this general character is disclosed in the co-pending application of Frank D. Jones, Serial No. 430,914 filed February 14, 1942, now U. S. Patent 2,352,388 dated June 27, 1944, and is provided with a main frame carrying the baling mechanism and a forwardly extending pick-up unit which is equipped with mechanism for gathering the windrowed hay or other crop and moving it into a position to be forced into the baling mechanism. When transporting the machine or moving the same from one field to another, and to relieve excessive strain on the pick-up parts as when turning sharp corners or the like, it is desirable, particularly in the counterbalanced type of pick-up units, to provide means for raising the front end of the pick-up unit above the ground in order to prevent accidental contact with the ground when traversing rough ground. According to the principles of the present invention, improved means has been provided for carrying the front end of the pick-up unit on the main frame of the baler, with suitable mechanism for raising or lowering the front end of the pick-up unit. Moreover, it is a further feature of this invention to provide means operable from the operator's station on the tractor for controlling the elevation of the pick-up unit.

It is a further feature of this invention to provide cable-controlled clutch means whereby the front end of the pick-up unit may be raised into transport position and locked in that position, and may subsequently be lowered by a second pull on the control cable which is arranged to release the latch, thereby permitting the unit to lower, all under control of the operator.

These and other objects and advantages of the present invention will be apparent to those skilled in the art after a consideration of the following detailed description, taken in conjunction with the accompanying drawings.

In the drawings:

Figure 1 is a fragmentary perspective view, showing a portion of the main frame and the adjacent part of a windrow pick-up, equipped with raising and lowering means in which the principles of the present invention have been incorporated;

Figure 2 is a vertical section taken generally along the line 2—2 of Figure 3;

Figures 3 and 4 are sections taken generally along the line 3—3 of Figure 2, Figure 3 showing the lowered position of the parts and Figure 4 showing the raised position of the parts; and Figure 5 is a fragmentary side view looking from the right side of the machine toward the left side.

Referring now to the drawings, the windrow pick-up press in which the principles of the present invention have been incorporated is similar to that disclosed in the above-mentioned Jones patent. Briefly, the windrow pick-up press includes a main or bale case frame 1 that extends generally rearwardly, the forward end being connected to a diagonally extending draft member 2, the rear end of the latter connecting to one end of the axle (not shown). Preferably, the main frame 1 includes two or more generally longitudinally extending angle bars 3 and cross angle bars 4.

Disposed for generally vertical movement at the right of the bale case frame 1 is a pick-up unit indicated in its entirety by the reference numeral 5. The front end of the unit is shown in Figure 1, the rear end being hingedly or pivotally connected with the main frame of the machine, as more clearly shown in the above-mentioned Jones patent. The pick-up unit includes endless chains or belts, as indicated by the reference numeral 7, each equipped with spring fingers 6 or the like for picking up a windrow from the ground and conveying the crop up to a cross conveyor which discharges the material into the baling chamber of the baler supported on the bale case frame 1. The present invention is not particularly concerned with the details either of the baling means or the pick-up unit, and hence the same have been shown only fragmentarily in Figure 1. When the machine is to be placed in operation, the front end of the pick-up unit is lowered until the fingers or other crop engaging means operate close to the ground surface, and when the machine is to be transported, as from field to field or along a road or highway, the front end of the pick-up unit is raised into a transport position. The present invention is particularly concerned with means whereby an operator on the tractor, to which the forward end of the diagonal draft member 2 is connected, may conveniently and easily raise and lower the front end of the pick-up unit 5, and such raising and lowering means will now be described.

A reel member 15, preferably but not necessarily a casting, is mounted for rotation on the hub 16 of a stationary reel supporting member 17. The latter member is secured to the forward corner portion of the bale case frame 1 adjacent the pick-up unit 5 by any suitable means, such as a bolt 18, and the stationary member 17 is fixed to the bale case 1 by means of an angle bracket 20 which is riveted or bolted to the frame angles 3 and 4. A pair of lugs 19 are disposed on opposite sides of the downwardly extending part of the angle bracket 20 and cooperate with the bracket 20 to hold the member 17 against rotation. The head of the bolt 18 is disposed outwardly, and a washer 21 is disposed between the head of the bolt 18 and the outer end of the hub 16, the washer 21 serving as means for holding the reel in place. Guard bars 22 having ends 24 (Figures 2 and 3) embracing the drum 15 are secured between the head of the bolt 18 and the hub 16. The reel member 15 is in the nature of a hollow drum having a laterally directed flange portion 23 which rides against the side of the stationary member 17. The member 15 is provided with radially outwardly extending flange 25 at the outer edge so as to hold the associated cable or cables in place on the reel 15. The latter member is provided with a pair of apertures 26 and 27. A lift cable, indicated in its entirety by the reference numeral 30, is passed into one of the openings 26 and 27 and out the other opening, thereby forming a loop that prevents the cable from slipping relative to the reel 15. The rear end section, indicated by the reference numeral 28, is connected to a bracket 31 fixed to the adjacent side of the pick-up unit 5. The other end section, indicated at 33, of the cable 30, extends upwardly and forwardly and passes over a roller 36 carried on a bolt 37 that is carried by a roller bracket 38 fixed in any suitable manner, as by a bolt 39, to the stationary member 17. It will be observed that the cable sections 28 and 33 are wound around and extend from the reel 15 in opposite directions, whereby when a pull is exerted on the cable section 33, the latter is unwound from the reel, turning the reel 15 in a direction to wind the other cable section 28 thereon, thereby lifting the associated pick-up 5. When the reel member 15 is permitted to turn in the other direction, the lifting cable section 28 is unwound from the reel, permitting the pick-up to lower, while the other cable section 33 is wound onto the reel 15. If desired, the cable sections 28 and 33 may be two separate cables, each having an end fixedly connected to the reel 15. In order to secure the end of the cable section 28 to the bracket 31 on the pick-up unit 5, I provide the cable section 28 with a clamp 32 and form a loop 34 which receives a bolt 35 for connecting the loop 34 to the clamp 31.

According to the principles of the present invention, locking means is provided which, when the pick-up is raised into its lifted position, automatically locks the reel against turning backwardly, which would permit the pick-up to lower, but the locking means may be released by exerting an additional pull on the operating cable sufficient to turn the reel 15 a slight additional amount in the raising direction, whereupon the locking means becomes ineffective and the pick-up 5 is then permitted to lower into an operating position.

The stationary member 17 is provided with an abutment section 41 and an open space below the abutment section 41. Preferably but not necessarily the abutment section 41 is formed integrally with the member 17, and the abutment section 41 extends in a generally arcuate direction and is disposed within the flange 23 of the reel 15. The inner circumferential portion of the flange 23 is provided with a lock receiving recess 42 having a cam shoulder 43 at one side and an abutment lug 44 at the other side. A latching or locking member 45, preferably in the form of a ball or roller, is disposed between the reel 15 on the inside of the flange 23 and the stationary member 17. The abutment section 41 on the stationary member 17 is provided with a shouldered or recessed portion 47. The rotatable reel 15 is provided with a lug 51 that is apertured to receive a pin 52 having a head 53. A relatively stiff spring 54 is disposed between the head 53 and the lug 51, and a cotter 56 is carried at the other end of the pin 52 so as to prevent the spring 54 from forcing the pin 51 out of the opening in the lug 51. Preferably, the spring 54 is held in a partially compressed or prestressed position. The abutment section 41 is formed with a curved shoulder 57 to receive the head 53 when the reel 15 is rotated into its raised position, which raises the pick-up unit 5 into its raised position.

The operation of the locking mechanism and associated parts is substantially as follows.

Referring first to Figure 3, which shows the mechanism in its lowered position, in which the lug 51 is against one part of the abutment section 41 on the stationary member, whereby rotation of the reel 15 in a lowering direction is prevented. When the operator desires to raise the front end of the pick-up unit 5, he pulls forwardly on the cable section 33. This rotates the reel 15 in a counterclockwise direction as viewed in Figure 3, winding up the cable section 28 and raising the front end of the pick-up unit. During the counterclockwise rotation of the reel 15, the first portion of this rotation carries the ball 45 around into a position where it enters the notch 42. Thereafter the ball 45 rides in the notch 42 until the latter reaches the end portion 58 of the abutment section 41 on the stationary member. When the notch 42 reaches the end 58, the ball 45 is then held in position in the notch 42 and cannot fall therefrom. As the counterclockwise rotation of the reel 15 is continued, the ball 45 is carried up into a position where it can fall behind the shoulder 47, as shown in Figure 4. It will be noted that this position is defined by the head 53 of the spring biased pin or plunger 52 engaging the shoulder 57 on the abutment section 41, which is on the stationary member. The operator can feel when the head 53 engages the shoulder 57, and that apprises him of the fact that the parts are in a position in which the ball 45 is disposed behind the shoulder 47. The shoulder 43 on the reel 15 is so constructed and formed that the ball 45 now is in a position to prevent the retrograde or backward movement of the reel 15, in a clockwise movement as shown in Figure 4. Thus, the ball 45 serves as a latch or lock preventing the cable section 28 from unwinding, thereby holding the pick-up unit in its raised position.

When it is desired to lower the pick-up unit, all that the operator has to do is to pull on the cable section 33 so as to rotate the reel 15 a slight amount in a counterclockwise direction (Figure 4) against the action of the spring 54 until the ball 45 drops over the forward edge 59 of the stationary abutment section 41. The ball then falls to the bottom of the flange 23 and is no longer in a position to prevent the retrograde or clockwise rotation of the reel 15. This therefore serves to unlatch the locking means and now permits the pick-up unit to lower, the rate of which is controlled by the operator holding back on the cable section 33 as much as may be necessary or desired. The parts therefore return to the position shown in Figure 3, the cable section 33 winding up on the reel 15 while the cable section 28 unwinds therefrom.

While I have shown the principles of the present invention as incorporated in a windrow pick-up press, it is to be understood that the raising and locking mechanism of the present invention may be incorporated in other types of agricultural implements and the like. Therefore, it is to be understood that the present invention is not to be limited to the particular details shown and described above, but that, in fact, widely different means may be employed in the practice of the broader aspects of my invention.

What I claim, therefore, and desire to secure by Letters Patent is:

1. The combination of a stationary member, a rotatable member movable relative to said stationary member about a generally horizontal axis, said rotatable member having a recess therein opening interiorly thereof, a locking member loosely disposed within said rotatable member and shaped to enter said recess and be carried therein when said rotatable member is moved about said axis, said stationary member being provided with recess means for receiving said loosely mounted locking member and providing for partial displacement of the latter from said first recess when said rotatable member has been moved into a position to carry said recess substantially over the recess means in said stationary member, said locking member in said partially displaced position acting between the stationary member and said rotatable member to prevent movement of said rotatable member about said axis in one direction from said position, and said stationary member having an open portion adjacent said recess means shaped to receive said locking member in its entirety, upon movement of said rotatable member about said axis in a direction opposite to said one direction, whereby said locking member moves out of the recess in said rotatable member and thus provides for movement of said rotatable member in said one direction away from said position.

2. In combination, a pair of members, one rotatable with respect to the other about an axis, a spring backed plunger carried by one of said members, a part carried by the other member and disposed in a position to engage the spring backed plunger and limit the rotation of one member with respect to the other in one direction about said axis, a latch movable into operative position preventing movement of said rotatable member about said axis in the other direction after said rotatable member has been moved about said axis in said one direction through an extent sufficient to bring said spring backed plunger and said part into engagement, means for moving said rotatable member relative to the other member an additional amount about said axis, after said part and said spring backed plunger have been brought into engagement, by displacing said spring backed plunger, and means responsive to said additional movement of the rotatable member for moving said latch means out of locking position.

3. In a mechanism for raising a part in a generally vertical direction with respect to a support and which includes a shiftable member adapted to be moved in one direction by an operator and means operated by a predetermined extent of movement of said shiftable member in said one direction for raising said part, the combination therewith of releasable latch means acting between said first mentioned means and said support, said releasable latch means comprising a notched portion carried by said shiftable member, a notched part carried by said support and disposed substantially underneath said notched portion when said shiftable member has been moved through said predetermined extent of movement, and a locking member loosely disposed in said notched portion and shaped to partially enter said notched part for locking said shiftable member against movement in the other direction, thereby holding said first mentioned part in raised position, resilient abutment means disposed on said support to engage said shiftable member for yieldably stopping movement of said first mentioned means at the end of said predetermined amount of movement, and said support having an open portion adjacent said notched portion into which said locking member may move from both said notched part and said notched portion after said shiftable member has been moved an additional amount in said one direction, thereby providing for lowering said part.

4. In a mechanism comprising a pair of parts, one of which is biased for movement into one position relative to the other, said mechanism comprising a reel adapted to be mounted on the other part for movement relative thereto about a generally horizontal axis, a flexible element trained over said reel and adapted to be connected with said one part, and means for rotating the reel in one direction to move said one part against said bias, means for locking said reel against movement in the other direction after the reel has been moved a predetermined amount in said one direction and including a stationary part disposed within the upper portion of the reel and provided with an upwardly facing recess and an edge adjacent thereto, a portion carried by said reel and provided with a generally radially inwardly facing recess, said recessed portion being rotatable with the reel from a position in the lower part thereof into a position overlying and closely adjacent to said upwardly facing recess on the stationary part, and a locking member loosely disposed in said reel and engageable in the recess in said reel portion when the recessed portion is in a lower position and movable with the recessed portion of the reel when the latter is rotated in said one direction to bring the recessed portion of the reel over said stationary part, said locking member being movable part way out of the recessed portion of the reel and into the recessed portion of said stationary part for locking said reel against movement in said other direction, and resilient abutment means on one of said reel and stationary part and acting against the other of said reel and stationary part for yieldably stopping movement of said reel in said one direction at the end of said predetermined amount of movement, and further movement of said reel in said one direction causing said recessed portion of said reel to carry said locking member out of the recess in the recess in said stationary part and over the edge of said stationary part into the lower portion of the reel so as to accommodate movement of said reel in said other direction.

5. Raising and detent mechanism for an implement part adapted to be raised into a lifted position relative to a stationary member, comprising a support, a member adapted to be connected with said implement part and mounted for rotation on said support about a generally horizontal axis, said rotatable member being provided with a radially inwardly facing recess spaced from said axis, said recess being shiftable from a lower position to an upper position when the implement part is raised, an arcuate section carried by said support and provided with a recess adjacent one end, the other end of said arcuate section extending arcuately downwardly from the recess in the support to a point substantially on a level with said axis, and a locking part disposed loosely in said rotatable member, being adapted to enter the recess in said rotatable member when the recess is in said lower position and be carried upwardly by the rotation of said rotatable member, when the implement part is being raised, to said upper position, said arcuate section of said support being disposed adjacent the path of movement of the recess of said rotatable member so as to retain said locking member therein until the latter reaches the recess in said arcuate section, said latter recess being shaped to receive said locking member when it is partially disengaged from the rotatable member recess when the latter is in its upper position, and means for rotating said rotatable member beyond said upper position so as to cause said locking member to fall off the upper end of said arcuate section and into the lower part of said rotatable member, thereby permitting a retrograde movement of the latter to lower the implement part and thereby bringing the recess of the rotatable member into its lower position in which said locking member reenters the latter recess.

6. Raising and detent mechanism for an implement part adapted to be raised into a lifted position relative to a stationary member, comprising a reel mounted for rotation about a generally horizontal axis on said member and connected with said part, yieldable means acting between said reel and said stationary member for limiting the rotation of said reel in one direction beyond a position in which said implement part is raised, said stationary member having an arcuate portion disposed adjacent the upper part of said reel, said arcuate portion terminating in an edge in the upper part of the reel and having a lock-receiving portion adjacent said edge, a locking member movably carried by said reel when it is rotated from a first position in which the implement part is lowered to a second position in which the implement part is raised, said locking member being carried by said reel in such position that, when the implement part is raised, the locking member engages said lock-receiving portion of the stationary member and serves thereby to prevent retrograde rotation of said reel and thereby holds said implement part in raised position, and means connected with said reel for rotating said reel in said one direction against the action of said yieldable limiting means a distance sufficient to cause said locking member to fall over the edge of said arcuate portion, thus disengaging said locking member from said stationary member and permitting retrograde rotation of said reel and lowering of said implement part.

MARCUS E. McCLELLAN.

REFERENCES CITED

The following references are of record in the file of this patent:

UNITED STATES PATENTS

| Number | Name | Date |
| --- | --- | --- |
| 39,130 | Doyle | July 7, 1863 |
| 153,716 | Lovell | Aug. 4, 1874 |
| 227,146 | Campbell | May 4, 1880 |
| 560,242 | Tillen | May 19, 1896 |
| 956,242 | Weaver | Apr. 26, 1910 |
| 1,036,844 | Hiner | Aug. 27, 1912 |
| 1,141,855 | Wedell | June 1, 1915 |
| 1,495,091 | Mach | May 20, 1924 |
| 1,819,605 | Johnston | Aug. 18, 1931 |
| 1,948,895 | Welty | Feb. 27, 1934 |
| 2,270,283 | Ewald | Jan. 20, 1942 |